United States Patent [19]

Frederiksen et al.

[11] 3,725,673

[45] Apr. 3, 1973

[54] SWITCHING CIRCUIT WITH HYSTERESIS

[75] Inventors: Thomas M. Frederiksen, Scottsdale; Ronald W. Russell, Mesa, both of Ariz.

[73] Assignee: Motorola, Inc., Franklin Park, Ill.

[22] Filed: Aug. 16, 1971

[21] Appl. No.: 171,995

[52] U.S. Cl................307/235 R, 307/242, 307/289, 330/30 D

[51] Int. Cl...........H03k 5/20, H03k 3/26, H03f 3/68

[58] Field of Search......307/235, 272, 288, 289, 290, 307/242, 247; 328/146, 147, 148, 149, 193, 203, 206; 330/30 D

[56] References Cited

UNITED STATES PATENTS

| | | | |
|---|---|---|---|
| 3,628,059 | 12/1971 | Niu | 328/146 X |
| 3,416,004 | 12/1968 | Taylor | 307/290 X |
| 3,449,593 | 6/1969 | Marino | 307/235 |
| 3,529,184 | 9/1970 | Conklin | 307/290 |
| 3,538,444 | 11/1970 | Adlhoch | 307/235 X |
| 3,569,739 | 3/1971 | Stolman | 328/146 X |

*Primary Examiner*—John W. Huckert
*Assistant Examiner*—Larry N. Anagnos
*Attorney*—Mueller & Aichele

[57] ABSTRACT

There is disclosed a switching circuit with a controllable hysteresis in which the hysteresis is introduced into the circuit through a feedback circuit which is connected to an internal node of the switching circuit. The input to the switching circuit is therefore independent of the hysteresis feedback circuit. The switching circuit is comprised first of a comparator which includes a differential amplifier, a differential-to-single-ended convertor, and ON-OFF biased output circuitry such that when an input signal is above a predetermined reference voltage, the switch is in an "open" condition and such that when the input signal falls below this predetermined reference voltage, the switch is in a "closed" or conducting condition. Hysteresis is introduced into the comparator circuit by selectively adding a predetermined amount of current to one or the other of the output nodes of the differential amplifier in the comparator circuit during times correlated with the operating condition of the switching circuit. This additional current raises or lowers the input voltage which is necessary to change the condition of the switching circuit and thus introduces a hysteresis into the circuit. The magnitude of the hysteresis is adjustable by controlling the amount of current delivered to the output nodes of the differential amplifier in the comparator. By the application of the hysteresis-producing current to the appropriate output nodes of the input differential amplifier, the hysteresis can be made to occur to one side or the other of the aforementioned reference voltage. Additionally, the hysteresis may be centered about this reference voltage.

12 Claims, 5 Drawing Figures

INVENTOR
Thomas M. Frederiksen
Ronald W. Russell
BY
Mueller & Aichele
ATTY'S.

INVENTOR
Thomas M. Frederiksen
Ronald W. Russell
BY
Mueller & Aichele
ATTY'S.

SWITCHING CIRCUIT WITH HYSTERESIS

BACKGROUND OF THE INVENTION

This invention relates to switching circuits having hysteresis and more particularly to a switching circuit in which the magnitude of the hysteresis as well as its position with respect to a reference voltage is controlled by use of a feedback circuit which couples a hysteresis-producing current into internal nodes of the switching circuit. In this manner the input characteristics of the switching circuit are unaffected by the provision of hysteresis.

The internal nodes of a switching circuit are any nodes other than the input and output nodes. These internal nodes are chosen because feedback to these nodes can be isolated from the input nodes by gain stages. In the subject switching circuit the internal nodes are the output nodes of an input differential amplifier.

Hysteresis in the subject switching circuit refers to the amount of voltage difference required at the input of the switching circuit to cause the switch once ON to go OFF or once OFF to go ON. A definition of hysteresis as it relates to the subject switching circuit will be given in connection with the detailed description of the invention.

In the past and especially in connection with Schmitt triggers, hysteresis has been accomplished through the use of a feedback circuit in which the output of the switch is fed back to the input of the switch. It will be appreciated, however, that direct feedback to an input node of a switching circuit can deleteriously effect the input signal to the switching circuit. Taking, for instance, a sensitive thermocouple or heat sensor, the addition of the feedback voltage to the input node of the switching circuit can alter the response characteristics of the sensing device. It is therefore undesirable to connect a feedback circuit to an input node of a switching circuit, because although a hysteresis can be achieved, input characteristics of the switching circuit are not constant.

In the present switching circuit hysteresis is introduced in a current mode, in which current is applied to an internal node of the switching circuit and more particularly to an output node of an input differential amplifier in the switching circuit in order to produce a hysteresis-type effect. Since the feedback path is not directly connected to the input nodes of the switching circuit, there is no effect on the input characteristics of the switching circuit.

The subject switching circuit utilizes as the switching element a comparator circuit which either saturates or does not saturate an output transistor. In its saturated condition the output transistor acts as a closed switch connecting a load to ground. When the transistor is not saturated it is rendered nonconductive such that the switching circuit is in an "open" condition. This transistor is either saturated or unsaturated as a result of the output of the comparator circuit. The switching circuit is in an ON or conducting condition when an input signal, $V_{in}$, has a voltage magnitude less than a reference voltage, $V_{ref}$, and is in an OFF or nonconducting condition when the input voltage to the comparator is greater than this reference voltage.

The comparator itself is composed of a differential amplifier with one of its inputs being supplied with the reference voltage, $V_{ref}$, and the other of its inputs being supplied with the input voltage, $V_{in}$. The differential amplifier has a pair of output nodes which are internal nodes of the switching circuit. These output nodes are coupled to a differential-to-single-ended convertor which in turn drives the aforementioned output transistor through certain output circuitry. When there exists a current differential between the output nodes of the differential amplifier in a given direction, the differential-to-single-ended convertor and output circuitry drives the aforementioned output transistor into saturation.

This type comparator in combination with a saturable transistor has in and of itself no inherent hysteresis. However by supplying current to selected output nodes of the differential amplifier after a given state of the saturable transistor has been achieved, hysteresis may be added to the circuit.

SUMMARY OF THE INVENTION

It is therefore an object of this invention to provide a switching circuit with hysteresis in which the hysteresis is introduced into the switching circuit by the introduction of current into an internal node of the switching circuit in response to a particular state of the switching circuit, the effects of said current being overcome to change the state of the switching circuit.

It is another object of this invention to provide a switching circuit with hysteresis in which the hysteresis is introduced into the switching circuit by the introduction of current into the output nodes of a comparator in response to a particular state of the switching circuit.

It is a further object of this invention to provide a switching circuit with hysteresis in which the hysteresis introduction does not affect the input node of the switching circuit.

It is a further object of this invention to provide a switching circuit with an easily adjustable hysteresis whose magnitude is adjustable by the amount of current delivered to the output nodes of a comparator circuit and whose direction with respect to a reference voltage is determined by into which of the output nodes of the comparator circuit additional current is coupled as a function of the output state of the switching circuit.

It is a still further object of this invention to provide a switching circuit with hysteresis in which the switching circuit is made up of a combination of a comparator having a differential amplifier, a differential-to-single-ended convertor, coupling circuitry and a saturable transistor in combination with means for applying additional current to the output nodes of the differential amplifier during preselected time intervals related to the state of the output transistor.

Other objects and features of this invention will become more fully apparent upon reading the following description taken in connection with the accompanying drawings.

BRIEF DESCRIPTION OF THE INVENTION

Figure 1:
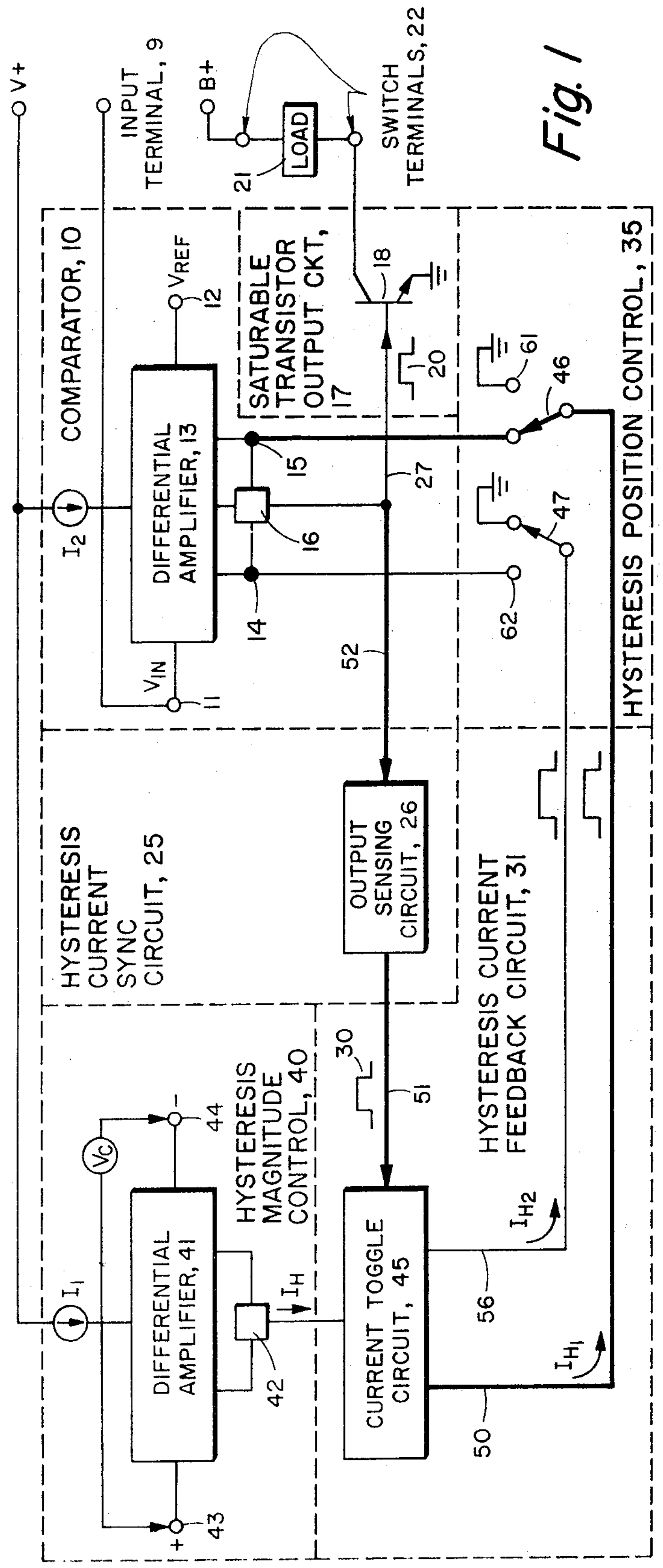
FIG. 1 is a block diagram of a switching circuit having a controllable hysteresis.

There is disclosed a switching circuit with a controllable hysteresis in which the hysteresis is introduced into the circuit through a feedback circuit which is connected to an internal node of the switching circuit. The input to the switching circuit is therefore independent of the hysteresis feedback circuit. The switching circuit is comprised first of a comparator which includes a differential amplifier, a differential-to-single-ended convertor, and ON-OFF biased output circuitry such that when an input signal is above a predetermined reference voltage, the switch is in an "open" condition and such that when the input signal falls below this predetermined reference voltage, the switch is in a "-closed" or conducting condition. Hysteresis is introduced into the comparator circuit by selectively adding a predetermined amount of current to one or the other or both of the output nodes of the differential amplifier in the comparator circuit during times correlated with the operating condition of the switching circuit. This additional current raises or lowers the input voltage which is necessary to change the condition of the switching circuit and thus introduces a hysteresis into the circuit. The magnitude of the hysteresis is adjustable by controlling the amount of current delivered to the output nodes of the differential amplifier in the comparator. By the application of the hysteresis-producing current to the appropriate output nodes of the input differential amplifier, the hysteresis can be made to occur to one side or the other of the aforementioned reference voltage. Additionally, the hysteresis may be centered about this reference voltage.

DETAILED DESCRIPTION OF THE INVENTION

The word hysteresis, as mentioned previously, refers to the amount of voltage difference required at the input of the switching circuit to cause the switch once ON to go OFF or once OFF to go ON. This difference refers to the fact that the switching circuit is made initially to be in one or the other of its states by this input voltage going in a given direction from one voltage level to that predetermined level which causes the initial state. Once in this state the input voltage must go in an opposite direction past this predetermined level in order to change the state of the switch from its initial state to the opposite state. The amount past the predetermined level that the input signal must go is the hysteresis. The magnitude of this difference in voltage between that which causes the initial condition and that which causes the opposite condition is called the magnitude of the hysteresis. Thus in one embodiment if the switching circuit is initially nonconductive or OFF at a certain gating voltage, that gating voltage necessary to render the switching circuit conductive is much less than that necessary to render it initially nonconductive. The voltage difference is the hysteresis.

A summary of how this hysteresis is produced in the subject circuit is now given for the cases when the hysteresis is to be to the negative and positive sides of the reference voltage, $V_{ref}$.

Assuming, for instance, that the above mentioned switching circuit is in an "open" condition when $V_{in} > V_{ref}$, then the subject circuit operates in one embodiment as follows: After the output transistor is turned OFF, the "open" condition of the switching circuit is sensed and simultaneously a current is switched to one output node of the hysteresis-producing circuitry (i.e., when $V_{in} > V_{ref}$). This output node of the hysteresis-producing circuitry is coupled to that output node of the input differential amplifier which has a current increase in response to a positive signal applied to the $V_{in}$ input node. The result of this additional current is that the $V_{in}$ input signal must drop to less than $V_{ref}$ by that amount which will compensate for the additional current delivered to the output node of the input differential amplifier in order to turn the switching circuit ON. In this case the hysteresis will be to the left or the negative side of $V_{ref}$. The result is that the $V_{in}$ necessary to achieve the switching circuit "open" condition is greater than that necessary to achieve a later "closed" circuit output condition for the switching circuit.

In the above embodiment, the hysteresis-producing current was delivered to that output node of the differential amplifier in which the current increased in response to increasing $V_{in}$. However, the hysteresis can be shifted to the right of $V_{ref}$ (in the positive direction) by delivering current to the output node of the differential amplifier in which current decreases in response to an increasing $V_{in}$. This is accomplished in the following manner: An ON switching condition is sensed and the hysteresis-producing current is switched to the other output node of the hysteresis-producing circuit. If this hysteresis circuit output node is connected instead to that output node of the differential amplifier in which the current decreases in response to increasing $V_{in}$, the input signal, $V_{in}$, must rise to $V_{ref}$ plus that voltage corresponding to the additional current delivered to the output node of the differential amplifier before the comparator will switch to an OFF condition. Thus once the switching circuit is in an ON condition, it is necessary to go beyond that voltage which would ordinarily turn the switching circuit OFF, in order to render the switching circuit in an OFF condition. This is hysteresis in an opposite direction to the first example and corresponds to the hysteresis being shifted to the right of $V_{ref}$. In this second embodiment, the hysteresis is the amount of voltage necessary to go from a switch ON condition to a switch OFF condition and is the exact reverse of the first mentioned embodiment.

By combining the first two embodiments the hysteresis can be made to straddle or symmetrically surround $V_{ref}$. Thus by various couplings of a feedback current to various of the output nodes of the aforementioned differential amplifier, the hysteresis can be either centered around $V_{ref}$, to the negative side of $V_{ref}$ or to the positive side of $V_{ref}$.

In addition the magnitude of the hysteresis can be controlled by the amount of the aforementioned current delivered to these output nodes. This is very simply accomplished in the hysteresis current producing circuit by utilizing a second differential amplifier having a single-ended output current. This current is made available at one or the other outputs of a third differential amplifier. The current generated by the second differential amplifier is switched one way or the other by the third differential amplifier depending upon the state of the output of the switching circuit. The output nodes of this third differential amplifier are connected to selected output nodes of the differential amplifier in the comparator circuit so as to produce the aforementioned hysteresis. The direction and magnitude of the hysteresis with respect to $V_{ref}$, depends on the interconnection of these output nodes to those of the differential amplifier in the comparator. After this connection the third differential amplifier toggles the current generated by the second differential amplifier to one or the other output nodes of the comparator according to the output state of the switching circuit, i.e., ON or OFF. Thus the hysteresis-producing current generated is made to flow through one or the other of the output legs of this third differential amplifier. Control of which leg of the third differential amplifier conducts current is accomplished by use of a second saturable transistor connected to one input of the third differential amplifier. This input is effectively grounded or not, corresponding to whether or not this second saturable transistor is saturated. This second saturable transistor is made to saturate when the first or saturable output transistor is saturated (corresponding to an ON switching circuit condition) and is unsaturated when the saturable output transistor is in its OFF condition (corresponding to an OFF switching circuit condition).

Thus a pair of differential amplifiers, one of which having a saturable input transistor to sense the state of the switching circuit, is used as a hysteresis current producing circuit to deliver the appropriate current to the appropriate output node of the differential amplifier in the comparator circuit during the appropriate state of the switching circuit. This is to say that the current generated is toggled between the output nodes of the comparator and ground or between these two output nodes during successive output conditions of the switching circuit so as to generate the aforementioned hysteresis.

In order to illustrate the operation of the subject switching circuit, a situation in which the subject switching circuit is utilized to recognize the occurrence of a potentially dangerous situation, such as the failure of the braking system in an automobile is considered. Assuming for the moment that there exists a sensing circuit which senses the pressure of the braking fluid in an automotive braking system such that the output of the sensing circuit is proportional to the fluid pressure, it will be appreciated that there will be a minimum fluid braking pressure which will result in safe braking action. This minimum braking pressure is translated by a transducer into a minimum predetermined signal voltage. This signal voltage is applied as the $V_{in}$ signal to the subject switching circuit. When this voltage descends to a point at which $V_{in}$ equals a reference voltage, $V_{ref}$, the switching circuit goes from an OFF condition to an ON condition thereby being capable of switching on an indicator such as a light bulb. However, if the motorist were to add more braking fluid to his braking system once the indicator light is lit, he must add significantly more fluid in order that the indicator light go off. That is to say once the indicator light is on, pressure in the braking system necessary to turn the indicator light off would be more than that which would initially indicate an operative system. This may be a built-in safety feature such that the amount of fluid pressure necessary to turn the light off would be governed by the hysteresis of the subject switching circuit. This provides that once a potentially dangerous condition has been recognized by the switching circuit being rendered conductive and the light bulb lighting a significantly greater effort must be made in order to get the indicator light to turn off. This significantly greater effort is determined by the hysteresis of the switching circuit to be now described in detail.

Before however describing the circuit in detail a further use for the subject switching circuit is now described. It will be appreciated that if the signal delivered to the input of the subject switching circuit is a time varying signal, then the subject circuit can be utilized essentially as a timing circuit in which the time varying signal must fall to a given level once having reached a higher level before the subject switching circuit will change its operative condition. The subject circuit can be used in a tachometer circuit in which, for instance, a magnetic pick-off is utilized to sense the speed of an internal combustion engine. It is well known that the output of the magnetic pick-off is nonuniform and may result in false tachometer readings. However by causing the switching circuit to respond only to a given voltage swing, i.e., a given hysteresis, accurate tachometer readings may be achieved absent the usual "noise" associated with magnetic pick-offs. It will be appreciated that this eliminates the necessity of utilizing hard clipping circuits in order to eliminate "-noise" from the magnetic pick-off. The noise rejection function is accomplished by the hysteresis of the subject switching circuit which will not respond to signals of small signal variation once the switch has achieved one or the other of its switching states.

The function of the switching circuit is now described with reference to the block diagram shown in FIG. 1.

Figure 4:
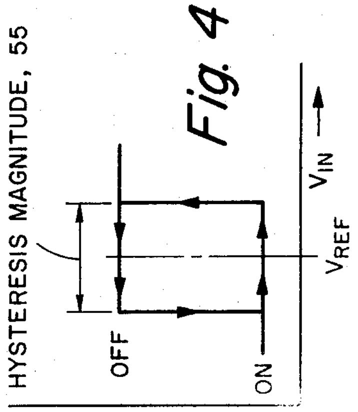
FIG. 4 is a diagram showing a hysteresis loop centered about a reference voltage, $V_{ref}$.

Referring to FIG. 1 a comparator 10 is shown having two input nodes 11 and 12. An input terminal 9 is connected to input node 11 supplying it with a voltage $V_{in}$. The input node 12 is supplied with a voltage $V_{ref}$ as mentioned hereinbefore. The comparator 10 consists of a differential amplifier 13 having output nodes 14 and 15 across which is connected a differential-to-single-ended convertor 16 which also includes drive circuitry to drive a saturable transistor output circuit 17. This output circuit contains a high-power transistor 18 which is driven into saturation whenever $V_{in}$ is less than $V_{ref}$. When $V_{in} > V_{ref}$, transistor 18 is nonconductive. There is therefore no conductive path through a load 21 connected across the switch terminals 22 from a B+ supply to ground. The differential amplifier 13, differential-to-single-ended convertor 16, and output transistor 18 make up a switching circuit which normally operates such that when $V_{in} > V_{ref}$, there is no completed circuit from B+ to ground and such that when $V_{in}$ is less than $V_{ref}$, transistor 18 is rendered conductive thus completing the circuit between B+ and ground. Absent any type of feedback circuit the comparator 10 and the output circuit 17 act in combination as a switching circuit without hysteresis. Hysteresis is introduced into the subject circuit by supplying a current of a predetermined magnitude to the output nodes 14 and 15, during times correlated with the output state of the switching circuit. In order to insure proper timing in the application of current to a particular output node, the subject circuit is provided with a hysteresis current syncing circuit 25 composed of an output sensing circuit 26 which functions as follows: When $V_{in}$ becomes less than $V_{ref}$, a signal 20 is delivered to the base of the transistor 18 by output circuit 27. The presence of this signal is sensed by the output sensing circuit 26 which generates a signal 30 having the same duration as the signal 20. The signal 30 is coupled to a hysteresis current feedback circuit 31 whose function is to deliver a hysteresis feedback current to one or the other of the output nodes 14 and 15 of the differential amplifier 13 at the appropriate time. By "appropriate time" is meant that the current must be delivered to an output node (14 or 15) soon after the switching circuit has changed to a new condition so as to preserve the new condition. Thus if the switching circuit is turned ON current is applied to keep the switch ON, making it harder to turn the switch OFF. The distribution of this current to these appropriate output nodes is controlled by the hysteresis position control circuit 35 whose function will be described hereinafter in connection with FIGS. 2, 3 and 4.

The current delivered to cause hysteresis is generated by the hysteresis magnitude control circuit 40 which consists of a second differential amplifier 41 and a differential-to-single-ended convertor 42. The output current derived from the output of the differential to the single-ended convertor 42 is designed $I_H$ and is in the direction of the arrow as shown. $I_H$ is a function of the control voltage at $V_C$ shown applied across the input terminals 43 and 44 of the differential amplifier 41 with the polarities shown. This hysteresis current is delivered to a current toggle circuit 45 which is a portion of the hysteresis current feedback circuit 31.

Figure 2:
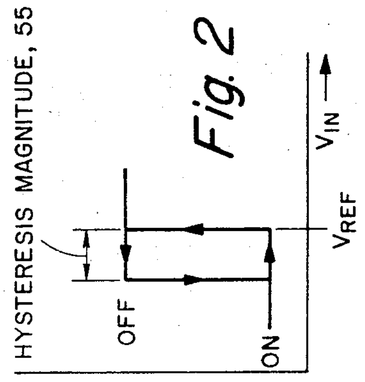
FIG. 2 is a hysteresis loop diagram showing the hysteresis loop located to the negative side of a reference voltage, $V_{ref}$.

With the switches 46 and 47 of the hysteresis position control circuit 35 in the position shown in FIG. 1, the hysteresis is introduced as follows: Assuming $V_{in} < V_{ref}$, there is a signal 20 in the output circuit 27 such that the transistor 18 is conductive and saturated and such that the indicator or the load 21 is activated. This is shown in FIG. 2 by going from the left of the diagram shown to $V_{ref}$ (as shown by the arrows). When $V_{ref}$ is reached by the $V_{in}$ signal, the switching circuit is rendered nonconductive. Simultaneously with the nonconductive state of the output transistor the output sensing circuit 26 generates a "signal low" signal 30 which causes the current toggle circuit 45 to toggle the current $I_{H_1} = I_H$ into the feedback line 50. Feedback line 50 is coupled via switch 46 to the output node 15. Node 15 is the output node at which current increases in response to an increase in the signal at the input node $V_{in}$ when a PNP differential amplifier 13 is utilized. Node 15 is therefore said to be operative in response to the input signal, since the current at the node 14 increases in response to an increase of $V_{ref}$, node 14 is said to be operative in response to $V_{ref}$. It will be appreciated that because of the differential action of the comparator as current increases in one output leg, the current in the other output leg decreases. In order to turn the switching circuit ON again, the additional current $I_{H_1}$ delivered to the node 15 must be counteracted by a current decrease caused by a decrease in the signal $V_{in}$. $V_{in}$ must be sufficiently low not only to decrease the current at node 15 below that generated at the output node 14 by the $V_{ref}$ signal, but also low enough to counteract the additional current at the output node 15 delivered by the feedback line 50. Thus $V_{in}$ must be less than $V_{ref}$ in order to turn ON the switching circuit, i.e., in order to change the unsaturated condition of transistor 18 to a saturated condition. This voltage differential in the $V_{in}$ input signal is shown in FIG. 2 by the arrow 55 which indicates the magnitude of the hysteresis. The feedback path in FIG. 1 with the position control circuit 35 having switches 46 and 47 in the positions indicated, is shown by the heavier lines 50, 51 and 52.

When the saturable transistor 18 is finally turned ON by $V_{in}$ being much less than $V_{ref}$, the output signal 20 is simultaneously generated. This is also sensed by the output sensing circuit 26 which causes the signal 30 to go "high," thereby causing the current toggle circuit 45 to toggle the $I_H$ current into feedback line 56. In this case the current in feedback line 56 is transmitted via switch 47 to ground. Thus whenever the subject switching circuit is in an ON condition, the hysteresis causing feedback current is shunted to ground. However, when the switching circuit is rendered nonconductive, the hysteresis producing feedback current is toggled to line 50 and is therefore coupled to that output node (i.e., node 15) which is operative in response to the $V_{in}$ input node 11. From inspection of FIG. 2 it will be appreciated that the hysteresis is to the left or negative going side of $V_{ref}$.

Figure 3:
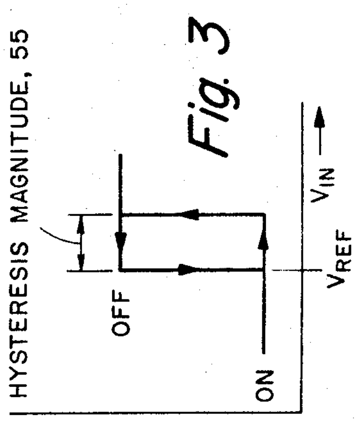
FIG. 3 is a hysteresis loop diagram showing the hysteresis loop to the positive side of a reference voltage, $V_{ref}$.

The position of the hysteresis can however easily be changed to rest either to the right of $V_{ref}$ or to be centered about $V_{ref}$ in the following manner: As shown in FIG. 3 the hysteresis is to the right of $V_{ref}$ or to the more positive side. In order to obtain a hysteresis to the right of $V_{ref}$, switch 46 is moved to the ground position shown by the reference character 61 and switch 47 is moved to the position 62 which couples feedback line 56 to the output node 14 of the differential amplifier 13. This couples the hysteresis-producing current to that output node of differential amplifier 13 which is operative in response to the $V_{ref}$ input node. In this case as $V_{in}$ is increased to $V_{ref}$, nothing happens. However, as $V_{in}$ is increased past $V_{ref}$ by an amount determined by the current delivered to the output node 14, the signal 20 is finally turned OFF rendering the transistor 18 into a nonconductive and unsaturated condition thus turning OFF the indicator or de-activates the load attached between the switch terminals 22. The reason for this delayed switch OFF action is because $V_{in}$ must be greater in order to overcome that amount of current delivered by the output line 56, i.e., $I_{H_2} = I_H$. In order to turn ON the transistor 18, it is only necessary that $V_{in}$ drop to $V_{ref}$ since in this case the hysteresis is in the positive direction with respect to $V_{ref}$.

If the hysteresis is to be centered around $V_{ref}$, then switches 46 and 47 couple their respective feedback lines to the output nodes 14 and 15 of the differential amplifier 13 such that the hysteresis referred to with respect to FIGS. 2 and 3 is operative in both directions on either side of $V_{ref}$.

SUMMARY

Figure 5:
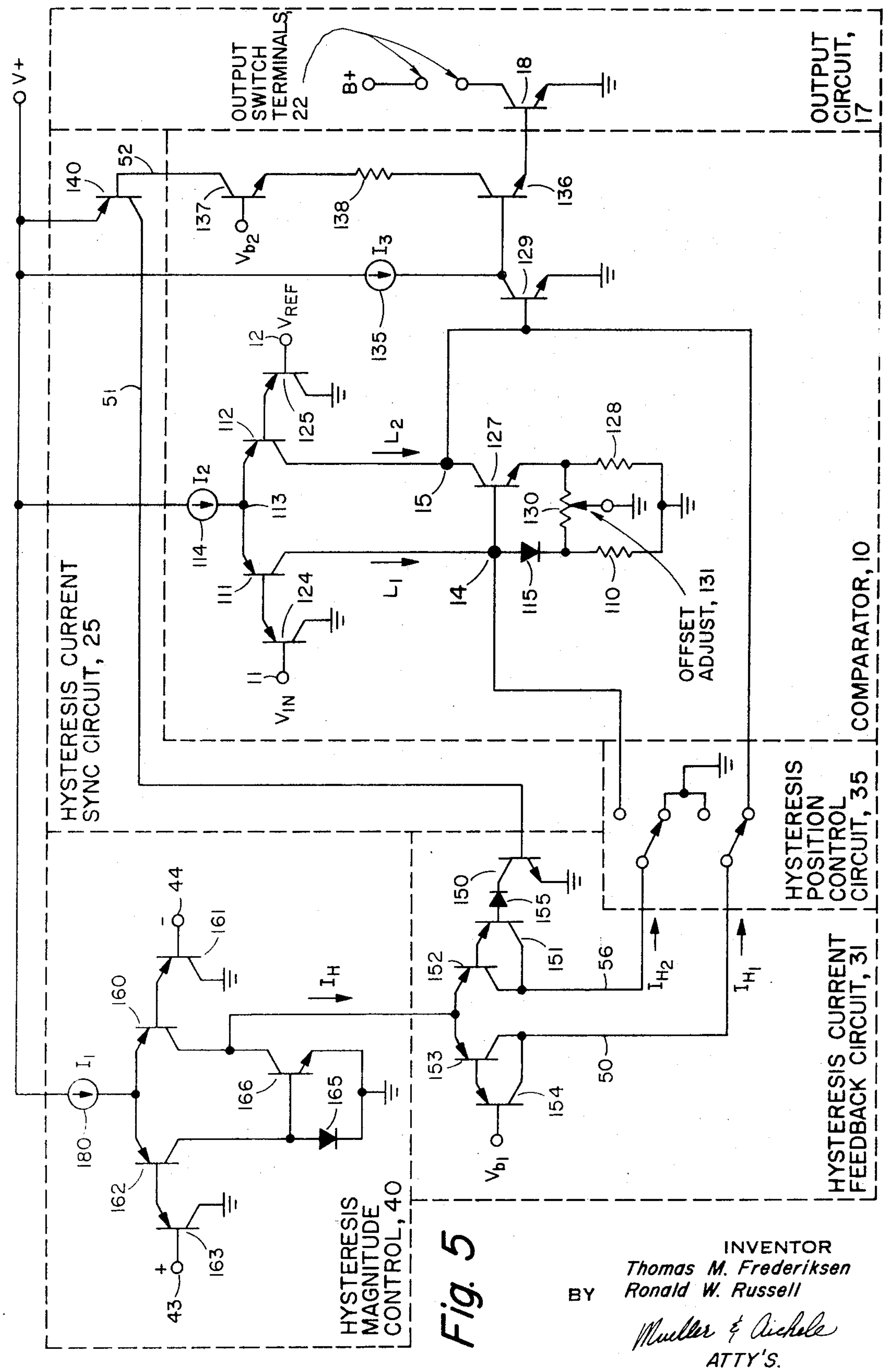
FIG. 5 is a schematic diagram of the entire switching circuit showing the generation of currents which introduce into the switching circuit a controllable hysteresis without affecting the input signal to the switching circuit.

What has been accomplished is as follows: It will be first appreciated that the feedback signal which is applied to the comparator circuit is not applied to the input nodes of the comparator circuit and therefore does not affect any device attached to the input terminal. Thus hysteresis is introduced without affecting the inputs to the switching circuit. Secondly, the magnitude of the hysteresis is easily and linearly controlled by the control voltage $V_C$ applied to the inputs 43 and 44 of the differential amplifier 41 so as to produce the appropriate current $I_H$. Thirdly, this hysteresis causing current $I_H$ is channeled to either one or the other or both of the output nodes of the differential amplifier 13 by the hysteresis control circuit 35 such that not only is the magnitude of the hysteresis controllable, but the position of the hysteresis with respect to a reference voltage is also controllable by the nodes to which the hysteresis-producing feedback current is coupled. A specific circuit embodiment of the subject switching circuit is shown in FIG. 5 in which like elements are labeled with numbers corresponding to those shown in FIG. 1. It will be appreciated that in the embodiment to follow, PNP differential amplifiers are utilized. It will however be obvious that NPN differential amplifiers could be used.

THE PREFERRED CIRCUIT

Referring now to FIG. 5 it will be appreciated that the basic configuration of the differential amplifiers 13 and 41 and the current toggle circuit 45 are that of a special type monolithic integrated comparison amplifier employing modified Darlington connected PNP transistors in a differential circuit configuration to compare input voltages having a common mode voltage range extending down to zero volts. These comparison amplifiers can therefore operate from a single voltage supply. The use of these special differential amplifiers offers the subject circuit an additional advantage of being operable from a single voltage supply with a common mode voltage range extending down to zero volts. This type of amplification circuit is the subject matter of a patent application Ser. No. 104,660 now U.S. Pat. No. 3,649,846 entitled "Single Supply Comparison Amplifier" in which Thomas M. Frederiksen, one of the inventors of the subject case is the inventor. Although the operation of these special differential comparison amplifiers is described in the aforementioned patent application, a brief description of the operation of the amplifier is given hereinbelow.

Taking, for example, the comparator 10, the basic comparison circuit includes a differential amplifier having a pair of lateral PNP transistors 111 and 112, the emitters of which are connected together at a common terminal 113 which in turn is connected to a current source 114 which provides the operating current for the differential amplifier transistors 111 and 112. This operating current is designated $I_2$. A single V+ power supply is provided for the comparison circuit as shown. The current source 114 causes the current supply to the comparison circuit to be relatively constant and immune from variations in the magnitude of the voltage supplied by the V+ power supply to the current source.

The transistors 111 and 112 constitute the output transistors of a modified Darlington amplifier circuit, including additional PNP input transistors 124 and 125, the emitters of which are connected to the bases of the transistors 111 and 112 respectively.

The comparison circuit operates such that when the potential applied to the base of the transistor 124 is higher (more positive) than that applied to the base of the transistor 125, the output of the transistor 112 is rendered conductive and the transistor 111 is rendered nonconductive.

In order to illustrate the unusual common mode range of these special differential amplifiers, assume that a DC reference potential is applied to the base of the transistor 125. This reference potential is $V_{ref}$ as aforementioned. One means for obtaining this reference potential is to utilize a voltage divider (not shown) connected in series with a potentiometer (not shown) between the aforementioned V+ supply terminal and ground. An adjustable tap from the potentiometer is connected to the base of the transistor 125. Variation in the DC voltage level applied to the base of the transistor 124 is in a range extending from ground to a maximum determined by the relative values of the resistors in the voltage dividing circuit. The range extends down to a ground potential when the base of transistor 125 is at ground potential because the potential on the emitter of the PNP transistor 125 (with the transistors 112 and 125 being rendered conductive) is equal to a voltage of $\phi$ (where $\phi = V_{be}$, the voltage drop developed across the emitter-based junction of the transistor 125). This permits the operation of the inside lateral PNP transistor 112 at a zero volt collector-base biasing which permits the collector of the transistor 112 also to be at a voltage $\phi$. This voltage with the transistor 112 being conductive biases the transistor 129 into conduction. Thus, the right-hand or reference side of the comparison circuit including the transistors 112 and 125 is capable of providing a usable output to the transistor 129 with a zero reference voltage.

It will be appreciated that the current drive to the base of transistor 129 is the difference in collector current from the collectors of transistors 111 and 112. This current difference is developed by a conventional differential-to-single-ended convertor comprised of a diode 115 and an NPN transistor 127. The offset of the hysteresis due to an initial imbalance of the differential amplifier 13 is corrected by the resistive network 110, 128 and pot 130 to be described later.

If the comparison circuit consisted only of the transistors 111 and 112 without the transistors 124 and 125, a very low DC signal level applied to the input of the circuit would be sufficient to drive the conductive one of the transistors 111 and 112 into saturation, especially with a low reference threshold at or near ground being applied to the base of the reference transistor. By utilizing the Darlington or modified Darlington amplifier configuration for the circuit, the base of the inner transistor, such as the transistor 112, is established at a potential which is $V_{be}$ or $\phi$ above the reference, even when the reference is at ground potential. This, then, allows the potential on the collector of the transistor 112 to be at least $\phi$ above ground which is sufficient to forward bias or drive the transistor 129 into conduction without saturating transistor 112. Without this $\phi$ voltage allowed on the collector of the transistor 112, it would be difficult to get a DC signal high enough to threshold the $V_{be}$ of the transistor 129 without saturating the PNP driving transistor. In addition to providing this advantage of preventing saturation of the transistors 111 and 112, the Darlington configurations also provide a low input current since they effect a high input impedance at the bases of the transistors 124 and 125.

It will be appreciated that the collector-emitter path of the transistor 127 is connected across the base-emitter junction of the transistor 129, and the collector of the transistor 127 is connected to the collector of the transistor 112. It will be further appreciated that instead of returning the collector of the transistor 111 directly to ground, the diode 115 is connected between the collector of the transistor 111 through the resistor 110 to ground. The diode 115 and the transistor 127 constitute the aforementioned conventional differential-to-single-ended convertor. The resistors 110 and 128 while not necessary are used to balance the two halves of the differential amplifier such that when $V_{in} = V_{ref}$ the current differential at the nodes 14 and 15 is zero. In order to further balance the differential amplifier a potentiometer 130 having a grounded tap 131 is used as an offset adjustment to further compensate for any imbalanced condition when the convertor is operating without hysteresis.

It will be appreciated that when the transistor 129 is rendered conductive, it conducts a current $I_3$ from current source 135. This current is therefore effectively grounded and diverted away from the base of a transistor 136 such that the transistor 136 is in an OFF condition. When, however, the transistor 129 is rendered nonconductive, the current generated by the current source 135 biases the transistor 136 into conduction thereby connecting the base of the transistor 18 to V+ via a current limiting transistor-resistor pair (137, 138) and the base emitter junction of a transistor 140. This not only biases the transistor 18 into conduction, but also saturates it. The resistor 138 is a current limiting resistor. Current limiting is also a function of the transistor 137 which has a base voltage equal to $\overline{V_{b_2}}$ which limits the voltage through the resistor 138.

When the transistor 136 is ON biasing transistor 18 into a saturated conduction, there is a PNP transistor 140 which upon the conduction of the transistor 136 causes a current to flow through the collector thereof through the line 51 to the base of a transistor 150 which is connected to one of the inputs of the current toggle circuit 45. Current in the line 51 saturates the transistor 150 thus turning ON transistor 151 in the conventional Darlington pair consisting of transistors 152 and 151 via diode 155. Diode 155 functions to raise the voltage at the base of transistor 151 sufficient to keep this transistor out of saturation when it is conducting. The other portion of the current toggle 45 is shown by the Darlington coupled transistors 153 and 154. The voltage applied to the base of the transistor 154 is $\overline{V_{b_1}}$. When the transistor 136 is nonconducting and transistor 151 is not ON (as would be the case when $V_{in} > V_{ref}$ corresponding to a "signal low" signal 30 from circuit 26 of FIG. 1) current $I_H$ delivered from the hysteresis magnitude control circuit 40 is shunted through the left-hand side of the current toggle circuit 45 thereby supplying $\overline{I_{H_1}}$ as described hereinbefore to the output node 15. When, however, the transistor 136 is conducting and there is a "signal high" signal 30 from the collector of the transistor 140 to the transistor 150 to saturate it, the current $I_H$ travels through the transistors 151 and 152 as shown designated $\overline{I_{H_2}}$ which in this case is shown grounded. In this case, as was the case in FIG. 1, the hysteresis is to the left of $V_{ref}$.

The hysteresis magnitude control circuit is also a Darlington pair type differential amplifier circuit including PNP transistors 160, 161, 162 and 163 connected as shown. The differential-to-single-ended convertor is shown by the diode 165 and the NPN transistor 166 connected between the collectors of transistors 160 and 162 respectively to ground. The base of the transistor 166 is connected to the collector of the transistor 162. The output of the differential-to-single-ended convertor is taken, as is conventional, at the collector of the transistor 166. By the application of a voltage polarized as shown, $I_H$ can be controlled. It is this $I_H$ which is coupled to the emitters of the PNP transistors 152 and 153 which in effect switch this hysteresis-producing current into either of the feedback lines 50 or 56 as described hereinbefore.

Reviewing now the complete operation of the switching circuit as shown in FIG. 5, if $V_{in}$ is less than $V_{ref}$, transistor 127 will be saturated. This effectively grounds the base of the transistor 129 which is therefore turned OFF. The current from the current source 135 is thus the base current for the transistor 136 which turns transistor 136 ON and which in turn saturates transistor 18 which turns transistor 18 ON. When this occurs, the collector current at the transistor 136 is limited by the resistor 138 and the voltage at the base of the transistor 137, which is $V_{b_2}$. However, this current is also taken from the base of transistor 140 causing the collector current of transistor 140 to flow. This current flow applies a voltage at the base of transistor 150 turning transistor 150 ON and forces the transistor 150 into saturation. This in turn switches the current from the hysteresis magnitude control circuit through transistors 151 and 152 such that this current is diverted to ground. Upon change of state of the switching circuit this current is diverted via transistors 153 and 154 to the output node 15 of the differential amplifier as described hereinabove.

With respect to the magnitude of the hysteresis, if the current delivered to the hysteresis magnitude control circuit 40, is $I_1$ as shown by the current source 180 and if the current delivered to the comparator's differential amplifier is $I_2$ as shown at 114 and $I_1 = I_2$, then the voltage differential between the input terminals 43 and 44 will be the hysteresis magnitude as shown by the arrow 55 in FIG. 2. The accuracy of the setting of the hysteresis is primarily a function of the offset of the differential amplifier 13, the offset of the differential amplifier 41, and the match of $I_1$ to $I_2$. As mentioned hereinbefore, the offset of the differential amplifier 13 is controlled by the potentiometer composed of the resistive element 130 and wiper arm 131. If the offsets of the differential amplifier 41 are zero, then the magnitude of the hysteresis will be exactly equal to the voltage differential between the inputs 43 and 44. If, however, there is some small imbalance between current source 114 and 180, then the accuracy of the conversion between the voltage across pins 43 and 44 will show up as a variation in the hysteresis such that the hysteresis will be slightly different than the differences in the voltages at the terminals 43 and 44.

In summary what has been provided is a switching circuit with hysteresis which allows for a very small amount of hysteresis, for instance 100 millivolts, to be accurately set for the switching circuit. The switching circuit is independent of the V+ power supply voltage because of the use of the modified Darlington PNP differential amplifiers. Further, since the feedback which causes the hysteresis is connected as a current to an internal node of the switching circuit (i.e., the output of the differential amplifier in the comparator circuit) the inputs are independent of the feedback circuit. Not only does this result in a negligible effect on sensing circuits which form the input to the switching circuit, but also the hysteresis of the switching circuit can be made to vary as a function time without affecting the input signal. Since there is no connection between terminals 43 and 44 and terminals 11 and 12, these are completely independent terminals and therefore the hysteresis can be changed as a function of time unlike those switching circuits in which hysteresis is introduced as a feedback signal to the inputs of the switching circuit.

What is claimed is:

1. In a switching circuit, having a comparator, the comparator comprising a first differential amplifier having an input node for receiving an input signal and two output nodes connected to a first differential-to-single-ended-convertor, and output circuitry having associated with it two discrete states, connected to the first digital-to-single-ended-convertor and having a pair of output terminals for connection to a load, means for introducing hysteresis into the switching circuit comprising:

a. selection means, having a pair of output legs, for monitoring the state of the output circuitry and selecting one of the output legs dependent upon the state;

b. means, responsive to the selection means, for generating a current and causing the current to flow through the selected leg, the magnitude of the current determining the magnitude of the hysteresis; and c. means for connecting the selected leg to at least one of the two output nodes.

2. The switching circuit of claim 1 wherein the output circuitry further comprises a first saturable transistor, driven by the first differential-to-single-ended-convertor, the main electrodes for the first saturable transistor being the output terminals of the switching circuit.

3. The switching circuit recited in claim 2 wherein said selection means comprises:

a current toggling circuit, coupled to said means for generating current for switching said current to one of two output legs; and means for sensing the condition of said first saturable transistor and for causing said current toggling circuit to switch current into a predetermined output leg thereof in response to a predetermined condition of said saturable transistor, whereby the direction of the hysteresis with respect to a reference potential applied to one of said input nodes is determined by to which output node of said first differential amplifier the current carrying leg is coupled.

4. The switching circuit as recited in claim 3 wherein that output leg of said current toggling circuit carrying current is coupled to that output node of said first differential amplifier, which due to an increase in current thereat has caused said switching circuit to change state, said hysteresis current thereby tending to preserve said changed state.

5. The switching circuit as recited in claim 4 wherein that output leg of said current toggling circuit not connected to an output node of said first differential amplifier is grounded.

6. The switching circuit as recited in claim 3 wherein one output leg of said current toggling circuit is permanently coupled to one of the output nodes of said first differential amplifier with the other of said output legs being grounded, whereby said hysteresis is to one side of said reference potential.

7. The switching circuit as recited in claim 3 wherein different output legs are coupled to different output nodes of said first differential amplifier whereby said hysteresis is centered about said reference potential.

8. The switching circuit as recited in claim 3 wherein said means for generating a current includes a second differential amplifier, a second differential-to-single-ended convertor, the output of said second differential-to-single-ended convertor being coupled to the input to said current toggle circuit, and means for applying a DC potential across the inputs to said second differential amplifier having a polarity so as to cause said current to flow, the magnitude of said hysteresis being dependent on the magnitude of the potential difference at the inputs to said second differential amplifier.

9. The switching circuit as recited in claim 8 wherein said first and second differential amplifiers have matched characteristics and include matched current sources for driving them, whereby the magnitude of the potential difference at the inputs of said second differential amplifier equals the magnitude of said hysteresis when only one of said output legs is connected to an output node of said first differential amplifier and whenever both of said differential amplifiers are balanced.

10. The switching circuit as recited in claim 8 wherein said current toggling circuit includes a third differential amplifier and a second saturable transistor coupled between one of the inputs to said third differential amplifier and ground, the state of said second saturable transistor controlling to which of said output legs said current is switched, the state of saturation of said second saturable transistor being controlled by the state of saturation of said first saturable transistor.

11. The switching circuit as recited in claim 10 wherein all of said differential amplifiers include two pairs of PNP transistors, the base of a first transistor in each pair coupled to the emitter of the second transistor in each pair, with the emitters of the first transistors of each pair being interconnected, the bases of the second transistors in each pair being the input nodes of each differential amplifier and the collectors of said first transistors of each pair being the output nodes or legs of said differential amplifiers.

12. The switching circuit as recited in claim 10 and further including means coupled to said first differential-tolsingle-ended convertor for adjusting the balance of said first differential amplifier thereby adjusting the offset of said hysteresis with respect to said reference potential.

* * * * *